(12) United States Patent
Lomet et al.

(10) Patent No.: US 8,170,997 B2
(45) Date of Patent: May 1, 2012

(54) UNBUNDLED STORAGE TRANSACTION SERVICES

(75) Inventors: David Bruce Lomet, Redmond, WA (US); Alan David Fekete, Cammeray (AU); Michael James Zwilling, Bellvue, WA (US)

(73) Assignee: Microsoft Corporation, Redmond, WA (US)

( * ) Notice: Subject to any disclaimer, the term of this patent is extended or adjusted under 35 U.S.C. 154(b) by 569 days.

(21) Appl. No.: 12/362,481

(22) Filed: Jan. 29, 2009

(65) Prior Publication Data

US 2010/0191713 A1  Jul. 29, 2010

(51) Int. Cl.
*G06F 7/00* (2006.01)
*G06F 17/00* (2006.01)

(52) U.S. Cl. ........................................ 707/683; 707/684

(58) Field of Classification Search ........................ None
See application file for complete search history.

(56) References Cited

U.S. PATENT DOCUMENTS

| | | | |
|---|---|---|---|
| 6,085,200 A | 7/2000 | Hill | |
| 2002/0138446 A1* | 9/2002 | Antonin et al. | 705/67 |
| 2004/0260726 A1 | 12/2004 | Hrle | |
| 2006/0004839 A1 | 1/2006 | Nagasawa | |
| 2007/0011105 A1 | 1/2007 | Benson | |
| 2007/0112885 A1 | 5/2007 | Farr | |
| 2007/0282848 A1 | 12/2007 | Kiilerich | |

OTHER PUBLICATIONS

Building the Customer-Centric Systems Architecture. http://mike2.openmethodology.org/wiki/Building_the_Customer-Centric_Systems_Architecture. last accessed Nov. 17, 2008. 3 pages.
Greenwood, P., et al. Reference Architecture v3.0. http://www.aosd-europe.net/deliverables/d103.pdf. Jan. 8, 2008. 49 pages.
File System Extensibility and Reliability Using an in-Kernel Database. http://www.fsl.cs.sunysb.edu/docs/kbdbfs-msthesis/index.html. Last accessed Nov. 17, 2008. 24 pages.

* cited by examiner

*Primary Examiner* — Uyen T. Le
(74) *Attorney, Agent, or Firm* — Lee & Hayes, PLLC

(57) ABSTRACT

Systems (and corresponding methods) that unbundle the kernel or storage engine of a database system are provided. The unbundling separates transactional aspects from storage aspects. The two components of the storage engine resulting from the unbundling are a transaction component (TC) and a data component (DC). Data storage access methods are implemented in the DC without the added complexity of dealing with transactions, which are handled separately in the TC. The interface supported by the DC is a logical interface, e.g., record oriented, in which the way that records are mapped to disk pages (or flash memory blocks, etc.) need not be exposed. The TC then deals with logical locking and logging, meaning that it need know nothing about the way pages are used in the DC.

15 Claims, 10 Drawing Sheets

UNBUNDLED STORAGE TRANSACTION SERVICES

BACKGROUND

The traditional architecture for a DBMS (database management system) engine has the recovery, concurrency control and access method code tightly bound together in a monolithic storage engine for records. In other words, the database kernel is a single multi-threaded component. As will be understood, the kernel in a DBMS is the central component responsible for managing the system's resources from transactions to data management. In conventional kernels, these responsibilities are tightly coupled and dependent upon one another to function properly.

Unfortunately, this combined architecture is not flexible or extensible. For example, as database management systems evolve to cloud-based deployments, traditional bundled DBMS kernels will not migrate well to this new distributed database system. Cloud computing opens up opportunities for easy and wide deployment of new, data intensive applications that will exploit cloud-based database management. These cloud-based deployments create new problems of scale and computing infrastructure—which, traditional DBMS kernels are not equipped to effectively and efficiently handle.

While some forms of DBMS decomposition has been suggested by researchers in the past, the common decomposition merely separated the query processing from the optimization components from the storage engine. As will be understood, cloud-based computing re-introduces interest in and pressure for again tackling this challenge of effectively and efficiently decomposing the DBMS, and specifically separating transactional functionality from data management.

SUMMARY

The following presents a simplified summary of the innovation in order to provide a basic understanding of some aspects of the innovation. This summary is not an extensive overview of the innovation. It is not intended to identify key/critical elements of the innovation or to delineate the scope of the innovation. Its sole purpose is to present some concepts of the innovation in a simplified form as a prelude to the more detailed description that is presented later.

The innovation disclosed and claimed herein, in one aspect thereof, comprises systems (and corresponding methods) to unbundle or partition the kernel (aka, storage engine) of a database management system (DBMS). This unbundling isolates transactional aspects from storage or data aspects. Two components of the storage engine resulting from such a split are referred to as the transaction component (TC) and the data component (DC). This enables data storage access methods to be implemented in the DC without the added complexity of dealing with transactions, which are now handled separately in the TC.

The interface supported by the DC can now be a logical interface, e.g., record oriented, in which the way that records are mapped to memory (e.g., disk pages, flash memory blocks . . . ) need not be exposed. The TC then deals with logical locking and logging, meaning that it need not know about the way records are mapped to pages or other storage in the DC. Effectively, the TC handles transactional services while the DC handles data services such as access methods and cache management. In accordance with the innovation, the TC and DC are architecturally independent and separate from one another, though with well defined interface and functional obligations.

To the accomplishment of the foregoing and related ends, certain illustrative aspects of the innovation are described herein in connection with the following description and the annexed drawings. These aspects are indicative, however, of but a few of the various ways in which the principles of the innovation can be employed and the subject innovation is intended to include all such aspects and their equivalents. Other advantages and novel features of the innovation will become apparent from the following detailed description of the innovation when considered in conjunction with the drawings.

DETAILED DESCRIPTION

Figure 1:
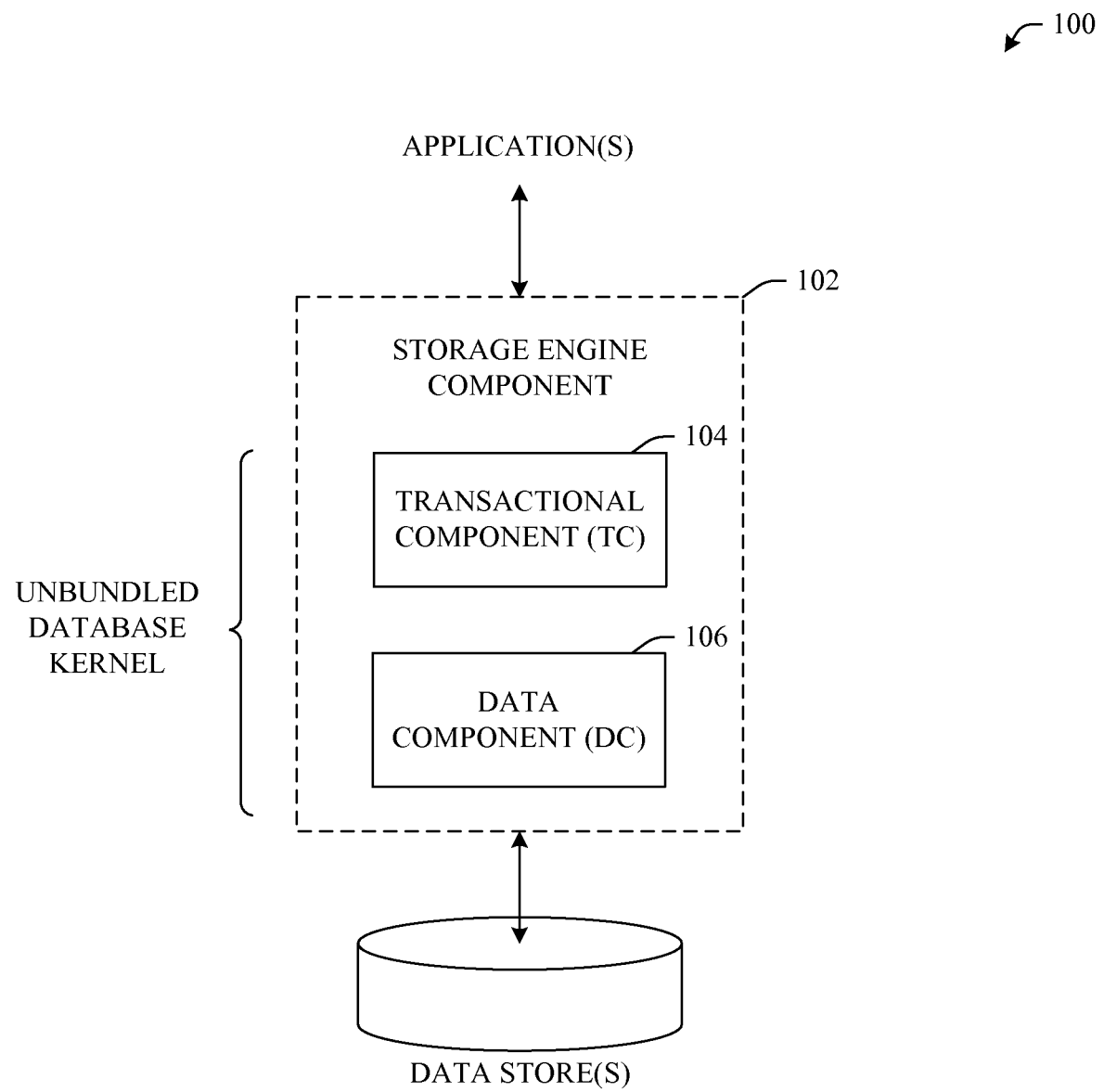
FIG. 1 illustrates an example block diagram of an unbundled database kernel in accordance with aspects of the innovation.

The innovation is now described with reference to the drawings, wherein like reference numerals are used to refer to like elements throughout. In the following description, for purposes of explanation, numerous specific details are set forth in order to provide a thorough understanding of the subject innovation. It may be evident, however, that the innovation can be practiced without these specific details. In other instances, well-known structures and devices are shown in block diagram form in order to facilitate describing the innovation.

As used in this application, the terms "component" and "system" are intended to refer to a computer-related entity, either hardware, a combination of hardware and software, software, or software in execution. For example, a component can be, but is not limited to being, a process running on a processor, a processor, an object, an executable, a thread of execution, a program, and/or a computer. By way of illustration, both an application running on a server and the server can be a component. One or more components can reside within a process and/or thread of execution, and a component can be localized on one computer and/or distributed between two or more computers.

As used herein, the term to "infer" or "inference" refer generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

Referring initially to the drawings, FIG. 1 shows a system 100 that illustrates an architecturally partitioned storage engine or unbundled database management system (DBMS) kernel 102. As illustrated, the unbundled DBMS kernel 102 can include a transactional component (TC) 104 and a data component (DC) 106. In operation, the TC autonomously manages transactional services while the DC autonomously manages data services. The details of each of these sub-components will be described in greater detail infra.

As will be understood, there are a number of reasons why splitting the storage engine into TC and DC is advantageous to a DBMS. The resulting database architecture is cleaner, with the details of how data is managed hidden from how transactions are supported. This split makes it easier to extend a database system with new access methods, where each such implementation need not deal with the specifics of how transactions are supported—thus, extensibility is greatly enhanced.

With machine architecture trends toward increasing the number of processors in a central processing unit or CPU (number of cores), such a split permits a more flexible deployment of database system elements to the cores, and may enhance parallelism and hence performance. Data stored "in the cloud" or in large servers involving hundreds or even thousands of processors is moved with some frequency to deal with changing data distributions and data growth as well as to deal with processor crashes/failures. In this cloud-based setting it is important to provide a logical interface to the data that does not depend upon knowing how the data is mapped to pages on a disk, or even to which disk it might be mapped.

When assigning database functionality to hardware components, moving functionality to disk controllers has been contemplated. It may be natural to assign a DC to a disk controller. Such an arrangement permits the "disk" to offer a logical, record-oriented interface, while leaving the placement of data on the disk to the controller.

Generally, the innovation describes mechanisms by which to split the kernel or storage engine 102 of a database system so as to separate transactional aspects from storage aspects. As illustrated, the two components of the storage engine resulting from such a split are called the TC 104 and the DC 106. This enables data storage access methods to be implemented in the DC 106 without the added complexity of dealing with transactions, which are now handled separately in the TC 104. In aspects, the interface supported by the DC 106 can now be a "logical" interface, e.g., record oriented, in which the way that records are mapped to memory (e.g., disk pages, flash memory blocks . . . ) need not be exposed. The TC 104 then deals with logical locking and logging. In other words, the TC 104 need not know anything about the way pages are used in the DC 106.

To enable the storage engine 102 split into TC 104 and DC 106, both TC 104 and DC 106 have "contractual" obligations that they must honor. Following is an informal discussion of some of these obligations. A more formal or detailed discussion is included later in this specification.

Referring first to a discussion of the DC 106, here, DC operations must be atomic. In other words, the operations must be serializable and executed in an order "consistent" with the serialization order in which the TC 104 sends them to the DC 106. DC 106 must ensure that update operations submitted by the TC 104 are "idempotent." In other words, the operations must be such that the DC 106 can determine whether the operations (or subset thereof) have been executed before. If so, they are not executed again. If not, then the DC 106 must be able to execute them under the same circumstances and producing the same result as would have been achieved the first time. Further, the DC 106 keeps the TC 104 informed about what is the oldest operation that is not yet stably recorded by the DC 106. This permits the TC 104 to manage its log of transactions and their operations.

Turning now to a discussion of the TC 104, the TC 104 must not send conflicting operation request messages to the DC 106 concurrently. If it were to do so, the result might be for the DC 106 to invert the execution order and so have conflict dependencies that are different from what is recorded on the TC log.

In operation, the TC 104 must resend its operation requests, each uniquely tagged with a message identification (ID), until it receives an acknowledgment from the DC 106 that its operation has been received. This, combined with idempotence insures exactly one execution. TC 104 must log the operations that it sends to the DC 106 before the DC 106 has made the effects of these operations stable. This is a form of "causality" in which the TC 104 sending of the message (as recorded on the log) is stable prior to the DC 106 writing the state changed by the operation to stable storage. More precisely, any message received stably must also have been "stably sent", including all preceding messages. It is to be understood that this principle is the origin of the write-ahead logging rule in database systems.

The TC 104 needs to keep the DC 106 informed about what part of its log is stable so that the DC 106 can determine which part of its state can be made stable. The TC 104 can be prepared to replay its log (e.g., by resending the requests to the DC 106) in an order that is consistent with the serialization order in which the operations were originally executed.

Figure 2:
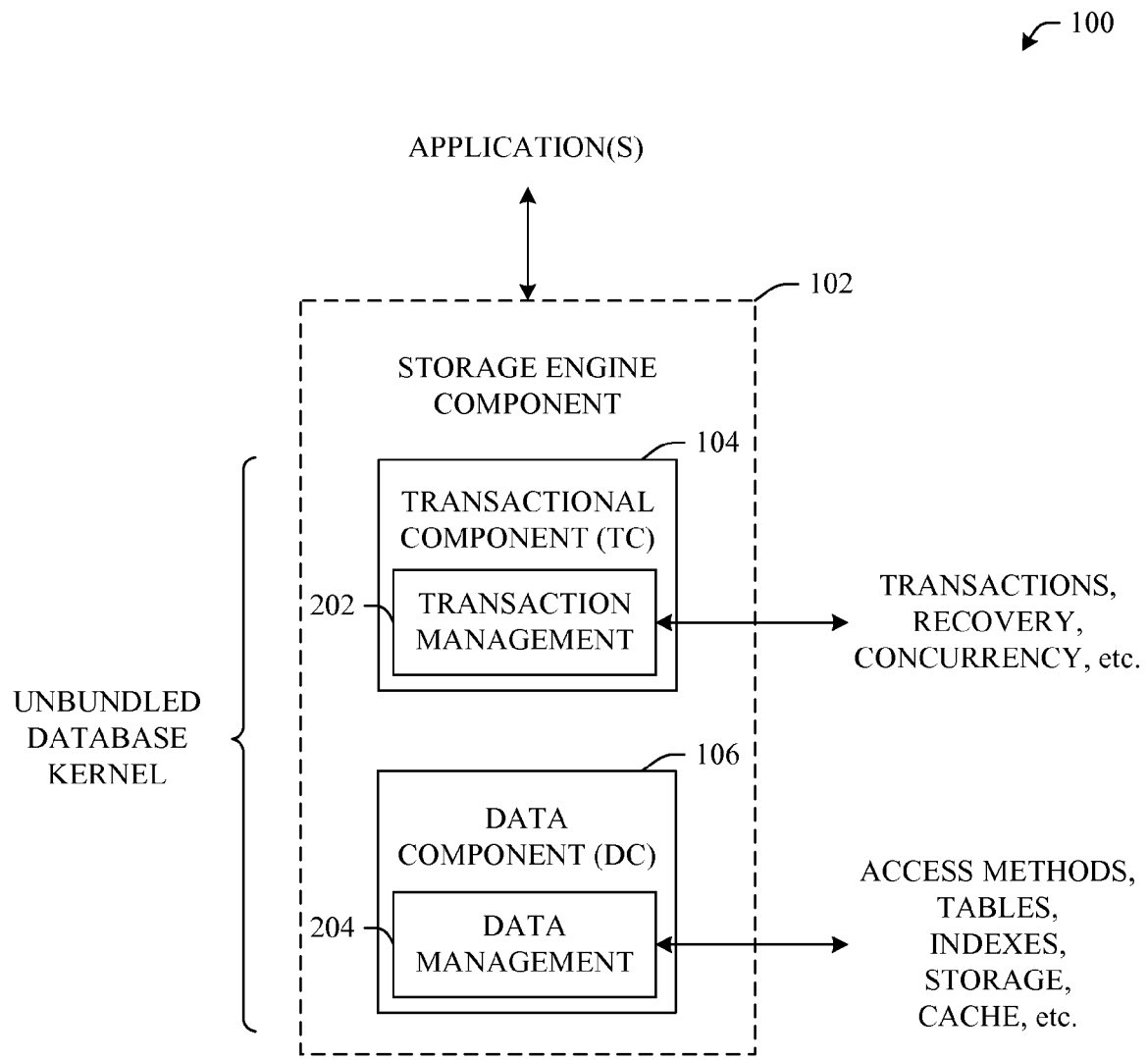
FIG. 2 illustrates an alternative architecturally unbundled database kernel in accordance with aspects of the innovation.

FIG. 2 illustrates an alternative block diagram of a storage engine component 102 in accordance with aspects of the innovation. As illustrated in FIG. 2, the TC 104 can include a transaction management component 202 and the DC 106 can include a data management component. Further, as shown, the transaction management component 202 facilitates management of transactions, recovery, concurrency, etc. as well as log entries associated therewith. Similarly, the data management component 204 is responsible for a specific set of operations, including but not limited to, access methods, tables, indexes, storage, cache, etc. as well as log entries and concurrency management associated therewith.

While both the TC 104 and the DC 106, together with their respective sub-components are illustrated within the storage engine 102, it is to be understood and appreciated that these components (104,106) are architecturally independent from one another. For example, it is to be understood and appreciated that these components (104, 106) and functionality associated therewith are unbundled from the traditional configuration of a DBMS kernel.

As described supra, the traditional architecture for a DBMS engine has the recovery, concurrency control and access method code tightly bound together in a storage engine for records. Contrary to this traditional approach, the innovation discloses a different approach, where the storage engine 102 is factored into two layers—each of which can have multiple heterogeneous instances. The TC 104 and corresponding transaction management component 202 works at a logical level only: it knows about transactions and their "logical" concurrency control and undo/redo recovery. However, the components (104, 202), do not know about page layout, B-trees etc.

The DC 106 and corresponding data management component 204 know about the physical storage structure. These components (106, 204) support a record oriented interface that provides atomic operations, but it does not know about transactions. Providing atomic record operations may itself involve DC-local concurrency control and recovery, which can be implemented using system transactions. The interaction of the mechanisms in TC 104 and DC 106 leads to multi-level redo, unlike the repeat history paradigm for redo in traditional integrated engines or even the multi-level transaction undo that is sometimes used with the more advanced integrated storage engines.

This refactoring of the system architecture could allow easier deployment of application-specific physical structures and may also be helpful to exploit multi-core hardware. Particularly promising is its potential to enable flexible transactions in cloud-based database deployments.

DBMS decomposition has remained an elusive goal, "up in the clouds." One can indeed easily separate the query processing and optimization components from the storage engine. However, the truly monolithic piece of a DBMS is the transactional storage manager that typically encompasses four deeply intertwined components:

1. A lock manager for concurrency control.
2. A log manager for recovery.
3. A buffer pool for staging database I/Os.
4. Access methods for organizing data on disk.

This monolithic piece of the DBMS has not conventionally been unbundled or separated into architecturally independent pieces. It will be appreciated that cloud-based computing re-introduces interest in and pressure for addressing this challenge of unbundling transaction services and data management.

Trends within the computing systems industry, especially for database systems, prompt programmers to rethink the database systems architecture and to consider disentangling or unbundling the previously integrated aspects of the database kernel, transactional services going to a TC 104 that is architecturally separate from data services (e.g., access methods and cache management) in a DC 106. Some imperatives are the following:

Cloud-based computing opens up opportunities for easy deployment of new, perhaps application dependent, database management. Cloud deployments create new problems of scale and computing infrastructure. Separating TC 104 functionality from DC 106 functionality enables cloud platforms to support transactions with much greater flexibility, regardless of where in the cloud the data and its DCs 106 reside. An example cloud-based aspect is described in greater detail infra.

New, light-weight data-management engines for specific application areas call for a composable run-time infrastructure with low overhead. For example, one might build an RDF engine as a DC 106 with transactional functionality added as a separate layer.

The major hardware trends of our time are (1) increasing numbers of cores on processor chips, and (2) increasing main memory latency. This suggests a rethinking of database architecture (even for traditional database applications such as OLTP (online transaction processing)) to enhance parallelism and improve cache hit ratios. The decomposition into TC 104 and DC 106 may improve both processor (core) utilization, since each component could run on a separate core, and processor I-cache performance, since each component will have shorter code paths and may result in much higher hit rates for the instruction cache(s) of one core.

Substantial processing power has existed for many years within the controllers for I/O subsystems. One appealing notion has been to move part of database functionality out of the CPU and into these controllers. Separating the DC 106 as described herein, permits moving this "data centric" functionality to the storage controllers, enabling a "disk" (or other memory) to support a record oriented interface instead of a page oriented interface.

A classic goal has been extensible database management systems. Adding a new access method to support new data types (e.g., shapes, avatars, etc. used in virtual worlds, for games, and 3D Internet) and their associated search needs is eased substantially when the type implementation (as DC 106) can rely on transactional services provided separately by TC 104.

Figure 3:
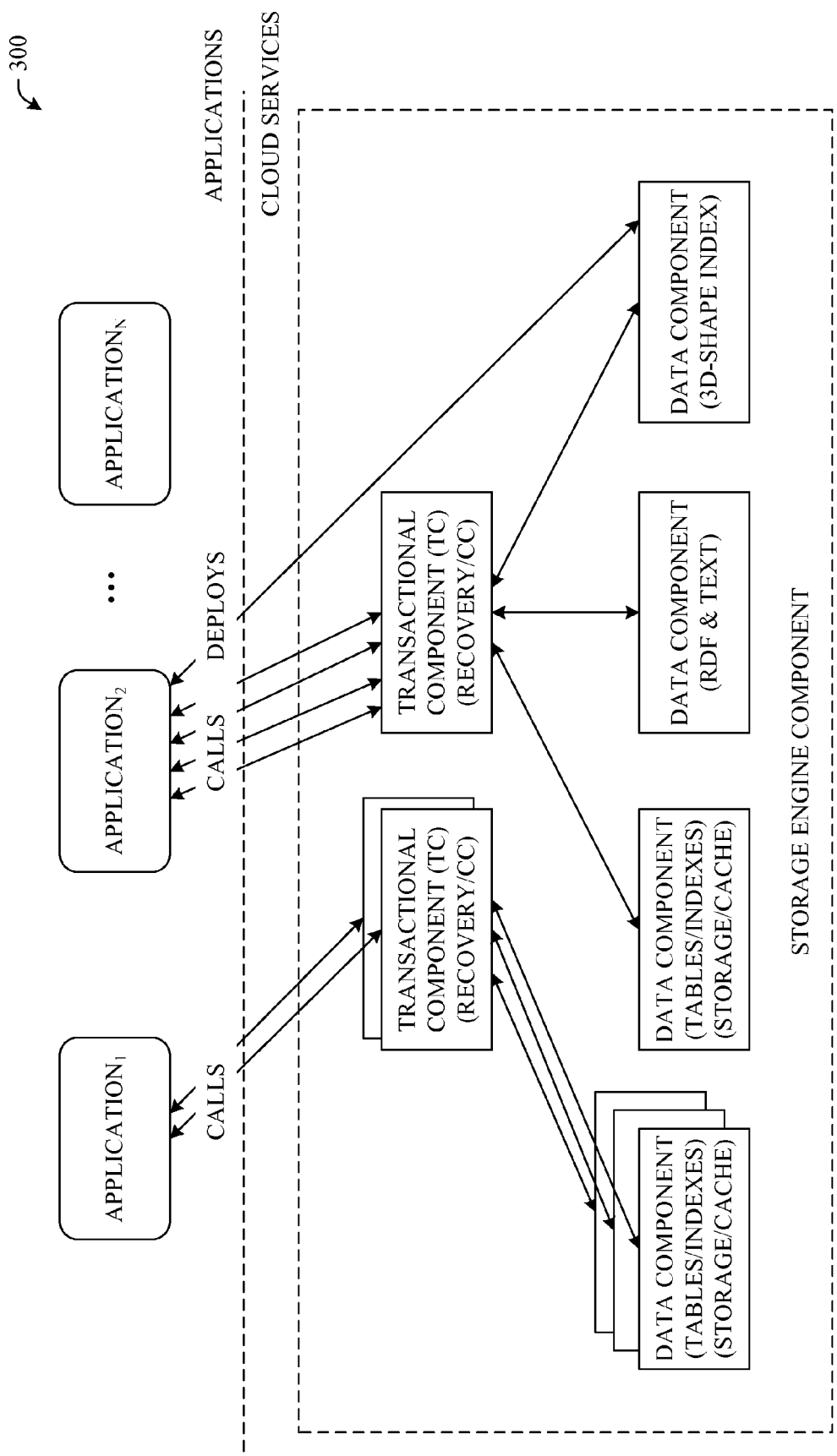
FIG. 3 illustrates an example cloud-based application deployment that exploits an unbundled kernel in accordance with aspects of the innovation.

Referring now to FIG. 3, an example block diagram architecture of an application executing on an unbundled database kernel system 300 is shown. As illustrated, the system 300 can employ multiple TCs (104) as well as multiple DCs (106). The system 300 will also be described infra in connection with an example movie review or rating scenario.

One issue that makes partitioning a database kernel difficult is that state-of-the-art concurrency control and recovery relies on knowledge of the way that storage is paginated, and how records are assigned to pages. For example, physiological logging requires each log record to deal with a single page. Also, state-of-the-art access methods use sophisticated ways to get high concurrency.

As described above, the innovation discloses architecture for database kernels in which transactional functionality in a TC 104 is unbundled from the access methods and cache management in a DC 106. In aspects, the TC 104 performs all locking for transactional concurrency control and logging for transaction abort and for transactional commit durability. All knowledge of pages is confined to a DC 106, which means that the TC 104 must operate at the logical level on records. The TC 104 invokes (and logs) logical operations of a DC 106 as illustrated in system 300 of FIG. 3.

A DC 106 knows nothing about transactions, their commit or abort. It is required to make the individual logical operations atomic and idempotent. Idempotence of DC 106 operations permits the TC 104 to resend operations to the DC 106, either during normal execution (perhaps after a response is lost) or later during recovery, while ensuring exactly-once execution of the overall system 300.

In aspects, both the TC 104 and DC 106 are multi-threaded, which is essential for high performance, but which introduces a number of subtle issues with which both TC 104 and DC 106 must deal. For example, TC 104 has an obligation to never send logically conflicting operations concurrently to a DC 106. In this way, the order of logical log records written by the TC 104 can be guaranteed to be serializably consistent with the physical ordering performed in a DC 106.

Because a DC 106 completely handles the pagination required for an access method like B-trees, it is the DC 106 that must deal with page splits and deletes. Such structure modifications themselves require concurrency control and recovery. Integrating recovery across both transaction and access method levels is a characteristic of modern database systems, but providing them separately from each other requires thinking anew about multi-level recovery.

Providing separate TC 104 and DC 106 permits instantiation of these components (104, 106) in a number of new and interesting ways. Because DCs 106 have longer execution paths, one might deploy a larger number of DC 106 instances on a multi-core platform than TC 104 instances for better load balancing. In a cloud-based environment, one would most often want DCs 106 to be close to the data, while the TCs 104 might have a much looser coupling. While multiple TCs 104 must never send conflicting operations to a DC 106 (e.g., because the order of operations will not be logged at the DC 106), it is nonetheless possible for TCs 104 to share data, especially when DCs 106 provide a versioning capability. Deploying TCs 104 that can share DCs 106 in this way enables the architecture to support some of the interesting cloud scenarios, without introducing a need for two phase commit, which is a blocking protocol that can also result in much longer latencies.

The following is included to provide perspective of the innovation. It is to be understood that this perspective is not intended to limit the innovation in any manner. Rather, it is to be understood that other applications of the subject innovation exist. These additional applications are to be included within the scope of this disclosure and claims appended hereto.

In the Web 2.0 landscape, there are new applications that desire fast and easy deployment on a care-free platform. Such applications include social-community forums (e.g., sharing photos, videos, reviews, ratings, etc.), Internet-based long-running games with many players, and information mash-ups that compose value-added portals from blogs, news, and other Internet sources. Cloud services are intended to provide a convenient solution for such applications. Unbundling, as suggested herein, can help Web 2.0 get fast transfer of original ideas into popular Internet sites.

As one example, consider a Web 2.0 photo-sharing platform. On first thought, this may seem merely to need persistent storage for large files. But the application also must manage users and their accounts, photo ownerships and access rights for other users, thematic groups for photos and users, friendships and other interactions among users, and so on. This should be consistent under high update rates; thus, there is a significant OLTP aspect.

Photos are often associated with annotations (e.g., tags) and reviews. This entails referential integrity constraints; corresponding operations must be guarded by transactions with appropriate scope. Reviews consist of natural-language text, and the application may have a non-standard index structure for this (e.g., for phrases that express opinions). For example, imagine sophisticated functionality that finds photos of the same object (e.g., the Golden Gate Bridge) uploaded by different users and combines them into a 3D model which in turn would be made searchable using the latest index structures for geometric shapes.

Of course, all this rich data could be mapped onto relational tables provided by a DBMS-style cloud service. Unfortunately, the application could not then utilize its advanced indexes for text phrases, 3D models, etc. Alternatively, it could use a simpler storage service, offered in the cloud, without transaction management. This service would just provide persistent store, with unlimited scalability and de-facto perfect availability, and the application program would implement its index structures on top of it. But now the application would also have to implement its own transactional concurrency control and recovery.

The innovation can accomplish this by unbundling the transactional issues from the actual data management. The photo-sharing application could use a combination of already available file and table managers and home-grown index managers as DCs 106. For transaction management it could directly use the services of a TC 104, offered in the cloud. This TC 104 (or these TCs 104 if one instantiates it multiple times for scaling up throughput) would be able to interact with the various DCs 106 via interaction contracts as will be explained in later sections. It is to be appreciated that the application's home-grown DCs 106 would have to be written so as to satisfy the DC 106 parts of the contracts. This is simpler than designing and coding a high-performance transactional storage subsystem.

Conventional industry-standard solutions to concurrency control and recovery do not work when transaction services are separated from access methods and cache management as described herein. Most of this specification is focused on dealing with recovery issues, which require a larger departure from current practice. However, it can be helpful to first outline how to deal with concurrency control differences as well.

For many operations, splitting the database kernel into TC 104 and DC 106 causes little trouble for a two phase locking approach to transactional concurrency control. The operations that involve updating or reading of records that are named by record identifiers can easily lock these records within a TC 104, prior to the TC 104 sending the request to the DC 106 that accesses the page containing the record. It is harder when ranges of records are being locked.

In traditional systems, where the database kernel is one integrated piece, a requested operation is actually executing within the page containing the data when it invokes concurrency control and recovery. Thus, an operation dealing with a range can determine the keys involved, then lock them using, e.g., key range locking (which requires knowledge of the specific adjacent keys of the range), before performing the actual access. However, in the unbundled approach of the subject innovation, the TC 104 needs to do the locking prior to sending a request to the DC 106. That is, the lock must be obtained before it is known which keys are present in (or just after) the range. Thus, the lock manager and the TC code that uses it are invested with techniques for locking ranges. Below are two method of dealing with the locking of ranges of records.

The first method deals with a fetch-ahead protocol. Here, the system performs an initial speculative probe to have the DC 106 return the keys to the next (in order) collection of keys. At this point, the TC 104 can lock those records, and submit the next request to do the read or write, together with a speculative request for the following keys. Should the records to be read or written be different from the ones that were locked based on the earlier request, this subsequent request becomes again a speculative request for the earlier records.

A second method deals with range locks. Here, the system introduces explicit range locks that partition the keys of any table. Many systems currently support some form of this by permitting table locks or page locks, however, the separation of the TC 104 from the DC 106 precludes locking pages. Thus, each range of the partition is locked prior to accessing the requested records. There can be speculative record accesses at partition boundaries, but most accesses can proceed without this. This protocol avoids key range locking, and hence gives up some concurrency. However, it can also reduce locking overhead since fewer locks are needed. The following discussion now turns to recovery.

In an unbundled kernel, ARIES-style recovery does not work, even when augmented with the usual multi-level recovery with physical repeating-history redo of log records, and logical, multi-level undo (which allows fine-grained concurrency control).

The DC 106 provides only record-oriented logical operations where the TC 104 knows nothing about pages. Hence, the TC log records cannot contain page identifiers. Redo needs to be done at a logical level. Pages and dealing with them is the exclusive province of the DC 106. Logical redo requires that, e.g., DC data structures be well formed (search correct) at the time that redo is performed, not simply when undo is performed. In the past, when logical redo was performed, it required operation-consistent checkpointing, which means that operation execution must be interrupted until no operations are active, at which point a checkpoint can be taken. This compromises both availability and performance.

LSNs (log sequence numbers) are the normal way of ensuring operation idempotence. This is very convenient in the conventional setting where the LSN is assigned after a page is latched for update, and hence operations on the page occur in strictly monotonic LSN order. With the TC 104 doing the transactional logging, the situation is more complicated. The separation of the TC 104 from the DC 106 together with the independent multi-threading of TC 104 and DC 106 means that the TC 104 will assign an LSN before the order in which operations access a page is determined. This can lead to out-of-order executions in which a later operation for a page with a higher LSN reaches the page before an earlier operation with a lower LSN. While these operations cannot conflict, the out-of-order LSNs must be dealt with.

DCs 106 may autonomously perform internal "system transactions" (e.g., page splits and other index tree reorganizations) that might not commute with TC-initiated logical operations. Despite this, the DC 106 needs to restore its indexes to a well-formed state prior to the TC 104 executing recovery. Thus, the DC structure modification operations will execute during recovery out of their original execution order. Further, the TC 106 has no way of knowing about these DC-internal actions. All it can do is assign LSNs and ensure that its redo repeats history by delivering operations in the correct order to the DC 106. The burden is on the DC 106 to manage LSNs on pages in such a way that this TC 104 strategy will work. It will be appreciated that conventional techniques fail for this.

DC 106 and TC 104 may independently fail, and a crash of one of them should not force amnesia for the other component, e.g., by requiring the DC 106 to discard all cached pages. The aforementioned issues will be discussed in greater detail below.

Figure 4:
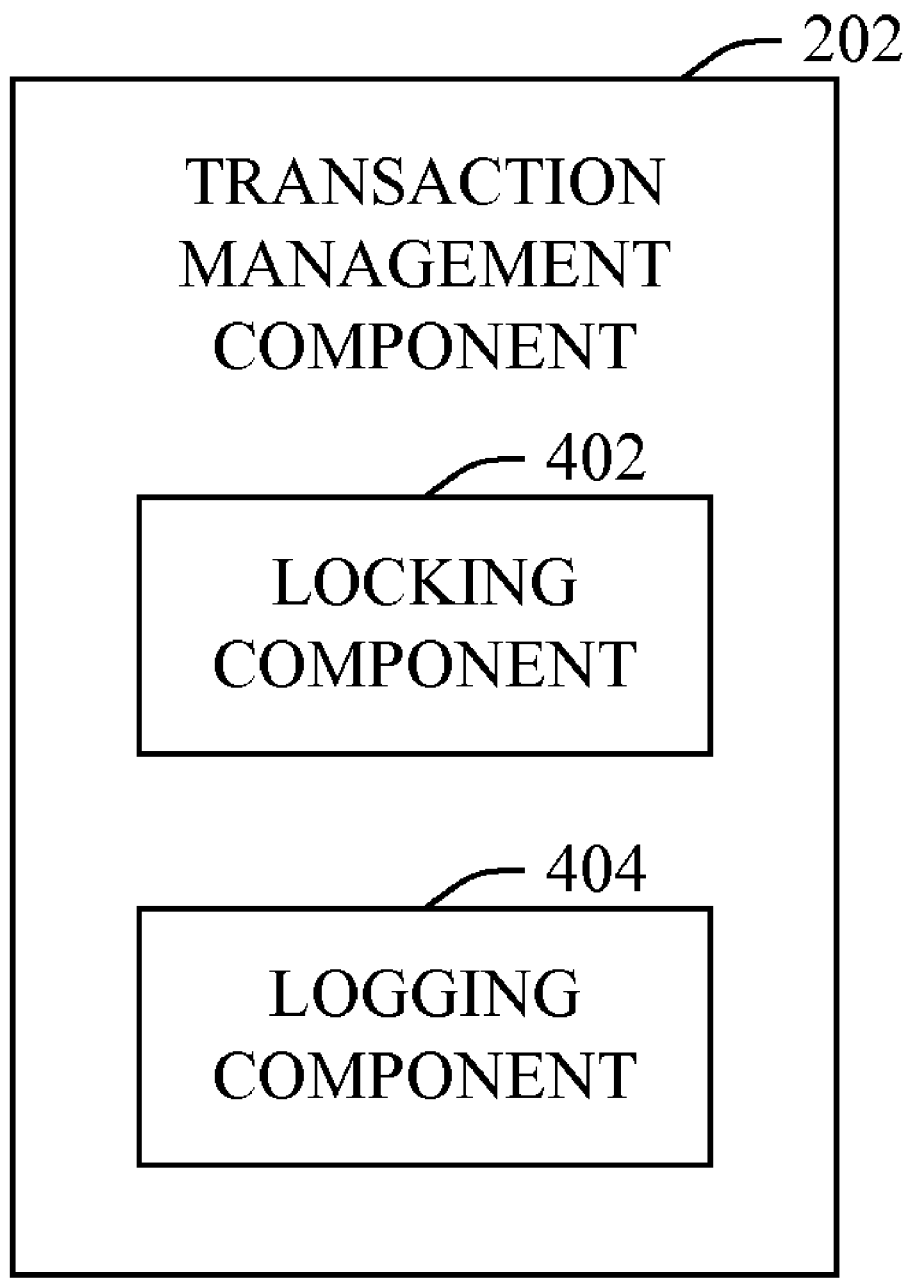
FIG. 4 illustrates an example block diagram of an architecturally independent transaction management component in accordance with aspects of the innovation.

Referring now to FIG. 4, an example block diagram of a transaction management component 202 is shown. Generally, the component 202 can include a locking component 402 and a logging component 404 which together facilitate concurrency control as well as recovery operations as appropriate in an unbundled architecture.

The discussion begins by describing the architecture of a separate TC 104 and DC 106 in terms of components which interact through exchange of particular messages. Following, the requirements on the interactions are described, to ensure that recovery can execute correctly. It is to be understood and appreciated that the TC 104 and the DC 106 are two "distributed" components that have an arms-length interaction.

With reference again to FIG. 4, the TC 104 functions as client to the DC 106. It wraps all requests to the kernel from higher in the database system or application stack. In doing so, the locking component 402, facilitates transactional locking to ensure that transactions are properly isolated or serializable. As part of this, the locking component 402 ensures that there are no concurrent conflicting operation requests submitted to the DC 106. Further, the locks cannot exploit knowledge of data pagination.

The TC 104 also provides transaction atomicity, that is, ensuring that for every completed user transaction that is provided to TC 104 from higher up the application stack, either a. The user transaction commits, after TC 104 has caused DC 106 to perform all the individual logical operations necessary to achieve the intended effect of the transaction, or b. The user transaction aborts, after TC 104 has caused DC 106 to perform a collection of logical operations whose combined effect is rollback, so there is no net change to the logical state. That is, TC 104 must ensure that DC 106 performs a (possibly empty) set of logical operations, followed in reverse chronological order by logical operations that are inverses of the earlier ones.

The logging component 404 facilitates transactional logging, both undo and redo, after appropriate locking. Undo logging in the TC 104 can enable rollback of a user transaction, by providing information TC 104 can use to submit inverse logical operations to DC 106. Redo logging in TC 104 allows TC 104 to resubmit logical operations when it needs to, following a crash of DC 106. That there are no conflicting concurrent operation requests ensures that logical log records can be written in OPSR (order-preserving serializable) order, even for actual out-of-order executions in multi-threaded mode. This must hold for whatever concurrency control method the TC 104 chooses to use including fine-grained locking as well as optimistic methods. The logging component 404 can also perform log forcing at appropriate times for transaction durability.

Figure 5:
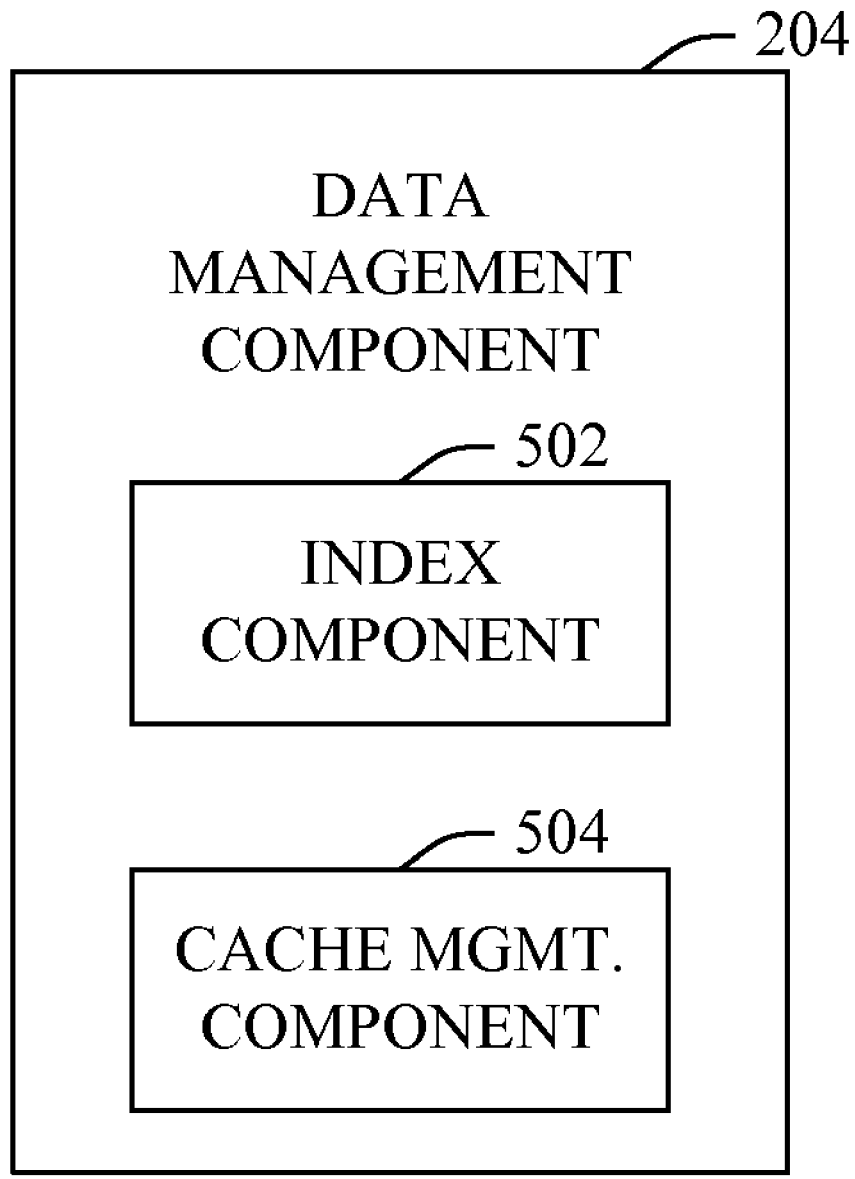
FIG. 5 illustrates an example block diagram of an architecturally independent data management component in accordance with aspects of the innovation.

Referring now to FIG. 5, an example block diagram of a data management component 204 is shown. Generally, the component 204 can include an index component 502 and a cache management component 504. Together these subcomponents enable the functionality of the DC 106. As will be understood, essentially, the DC 106 acts as a server for requests from the TC 104. The DC 106 is responsible for organizing, searching, updating, caching and durability for the data in the database. It supports a non-transactional, record oriented interface. The way in which the records are mapped to disk pages is known only to the DC 106 itself, and is not revealed to the TC 104.

In operation, the DC 106 provides atomic operations on its data (e.g., relational records, XML documents, encapsulated objects, etc.). Atomicity for individual logical operations is a way to permit the linearizing of concurrent operations, conceptually isolating them so that they appear as if they were indivisible with regard to concurrent executions. More precisely, operation atomicity means that there is a total order on all the operations, compatible with any externally observable order (e.g., where one operation has returned before another is requested for the first time) and compatible with the results returned such that each operation's result reflects the state produced by all the operations ordered before that operation.

Atomic operations ensure that serial replay of operations during recovery is possible. To allow multi-threading within DC 106, while still having atomic operations, each operation will need to latch whatever pages or other data structures it operates on, until the operation has been performed on all the pages. However, as with page latches in traditional storage engines, these latches are held for very short periods, and latch deadlocks can be avoided via the ordering of latch requests.

The index component 502 maintains indexes and storage structures behind the scenes. For simple storage structures, each record lies on a fixed page, and DC 106 can maintain the indices easily. However, for a structure like a B-tree, where a logical operation may lead to re-arrangements that affect multiple physical pages, the maintenance of indices must be done using system transactions that are not related in any way to user-invoked transactions known to the TC 104; implementation of system transactions may involve their own concurrency control and recovery.

Finally, the cache management component 504 provides cache management, staging the data pages to and from the disk as needed.

Referring now to a discussion of interaction between the TC 104 and DC 106 in aspects of the innovation. Some distributed application infrastructures describe "interaction contracts" which ensure that both sender and receiver of a message would agree on whether the message was sent, independently of system or communication failures. The principles described herein have similar intent, but there are differences, especially as in an unbundled database kernel, many interactions are not made stable immediately, but rather caching is used extensively, with state made stable lazily.

Causality means, that the sender of a message remembers that it sent the message whenever the receiver remembers receiving the message. This must be true during normal execution (trivial to do with volatile execution state) as well as in the case that one or more parts of the system fail. It is causality that leads to the classical write-ahead logging protocol. As stated above, in an unbundled architecture, partial failures are possible, whereby either TC 104 and/or DC 106 fails. To respond to partial failures in a high performance manner, the innovation employs new cache management techniques for the DC 106 provided by the cache management component 504.

In operation, unique request IDs are used. More particularly, the TC 104 labels each of its operations with a unique, monotonically increasing request identifier (usually an LSN derived from the TC log). It is to be understood that these TC request IDs make it possible for the DC 106 to provide idempotence.

With regard to idempotence, the DC 106 manages request IDs within its data structures so that it can decide when its state already reflects the execution of the request, and when it does not. It must ensure that it can successfully execute all unexecuted requests so as to achieve their original results, both during normal execution and during restart. And it must not re-execute requests whose results are already reflected in the database state. Providing idempotence in the innovation's setting is a substantial technological challenge requiring new techniques.

The TC 104 resends the requests until it receives some form of acknowledgment from the DC 106. TC 104 resend with unique request IDs, working with DC 106 idempotence, enable exactly-once execution of logical operations.

Recovery is enabled in accordance with the unbundled solution. The TC 104 makes all requests to the DC 106 in terms of logical (record-oriented) operations. The DC index structures must be well-formed for redo recovery to succeed. The DC 106 must recover its storage structures first so that they are well-formed, before TC 104 can perform redo recovery, not simply before undo recovery. Thus, system transactions are logged such that they can be executed during recovery out of their original execution order.

Contract termination is important to consider in accordance with the innovation. In other words, the innovation employs a protocol between TC 104 and DC 106 that permits the guarantees for causality and idempotence to be released. For example, the TC 104 will eventually refrain from resending some operations during restart. This corresponds to checkpointing in a conventional kernel; it involves coordinating the stable part of the recovery log managed by the TC 104 with the stable part of the database state managed by the DC 106.

Following is a summarization of the interface through which necessary information is passed between TC 104 and DC 106. This information is presented as functions or methods of DC 106, to be invoked by TC 104; however, the innovation does not limit the implementation technology for information exchange, and it is indeed contemplated that, in a cloud-based environment, asynchronous messages might be used with the request flowing in one direction, with a later reply in the reverse direction, while signals and shared variables might be more suited for a multi-core design. Also, while usually TC 104 is driving each interaction, there are some situations where DC 106 will spontaneously convey information to TC 104; for example, following a crash of DC 106, a prompt is needed so that TC 104 will begin the restart function.

In aspects and with regard to a perform operation argument, TC 104 provides DC 106 with the information about the logical operation, including the operation name and arguments (among which is the table name and the key for the record involved, or description of a range of keys as discussed supra), and also a unique identifier which is typically the LSN from the TC-log record for this operation. Resends of the request can be characterized by re-use of this unique identifier. The eventual reply for this request includes the request identifier so it can be correlated to the request, as well as the return value of the operation itself. Note that the information given to DC 106 does not carry any information about the user transaction of which it is a part, nor does DC 106 know whether this operation is done as forward activity or as an inverse during rollback of the user transaction.

An argument, end_of_stable_log(EOSL), is the LSN for the last entry from the TC-log that has been made stable. DC knows that all operations with this operation identifier, or lower, will not be lost in a crash of TC, and so causality allows DC to make any such operation stable in DC. This function is how WAL (write-ahead logging) is enforced in an unbundled engine. A traditional storage engine performs exactly the same check but without using messages to convey the information.

With regard to checkpointing, an argument, newRSSP, is an LSN to which TC 104 wishes to advance its redo scan start point. DC 106 will reply once it has made stable all pages that contain operations whose page LSN (or, as described later, its page abstract LSN) is below newRSSP; this releases the contract requiring TC 104 to resend these operations, and only at this point can TC 104 actually advance its start point for replaying operations in subsequent restarts. DC 106 may also proactively make pages stable, and could spontaneously inform TC 104 that the RSSP can advance to be after a given LSN.

The low_water_mark function can inform DC 106 that TC 104 has received the response from every logical operation with LSN up to and including the argument LWM (low water mark). Thus, DC 106 can be sure that there are no gaps among the lower LSN operations which are reflected in cache pages.

The use of this information is discussed in greater detail below. Like end_of_stable_log, this is important for deciding when pages in DC's cache can be flushed to disk. Therefore, one might trade some flexibility in DC 106 for simplicity of coding, by combining end_of_stable_log and low_water_mark into one function that simply informs DC 106 of the operation ID, for which it is safe to flush a page from the DC cache so long as the page contains no operation beyond this LSN.

The restart function can be described as a single complicated function, though in practice the information passed could be batched and conveyed in several messages. TC 104 informs DC 106 that restart is commencing, and that it must discard any information about operations with LSNs higher than the last one in the stable TC log. Most often these operations would be lost forever; causality ensures that any such information is not yet stable in DC 106. Also, the restart function includes resending all operations on the stable TC-log from the redo scan start point (RSSP) onwards; after they have been applied by the DC 106, which itself can occur after DC 106 resets its state as described below. Thereafter, TC 104 can send logical operations which are inverses for those operations of user transactions that need rollback. Finally, once all have been applied in DC 106, DC 106 can acknowledge completion of the restart function, allowing normal processing to resume. If DC 106 fails, one can assume an out-of-band prompt is passed to TC 104. Thus, TC 104 knows to begin restart.

Continuing with a discussion of some of the innovation's techniques that deal with new complexities of providing idempotence for "unbundled" recovery. As discussed above, one particular hurdle of an unbundled DBMS kernel is the handling of out-of-order operation execution. Because of the arms length separation of TC 104 from DC 106, and their multi-threading, TC 104 operation requests can arrive at the code accessing data on a page in an order that differs from the order of TC request IDs (LSNs). This undermines the usual recovery test for idempotence in which a log operation's LSN is compared to an LSN stored in the data page impacted by the operation. This traditional test is simply: Operation LSN<=Page LSN When this test is true in a monolithic or bundled system where logical log records are produced (and given LSNs) during a critical section in which the page is modified, it means that the page contains the effects of the operation, and redo is prohibited for the logged operation. Otherwise, the operation must be re-executed and the page, along with its LSN, is updated.

Because of out-of-order execution scenarios in an unbundled system, this test is no longer suitable. If an operation Oj with LSNj executes before an operation Oi with LSNi, and LSNi<LSNj, and the page is immediately made stable after Oj's execution, it will then contain a page LSN equal to LSNj. The traditional test will incorrectly indicate that Oi results are included in the page, and that there is no need to re-execute Oi.

In aspects, this difficulty could be addressed by introducing record level LSNs, since updates are conflicting record operations, and conflicting operations cannot execute concurrently. However, this is very expensive in the space required. Therefore, the innovation describes a page-LSN oriented solution.

Figure 6:
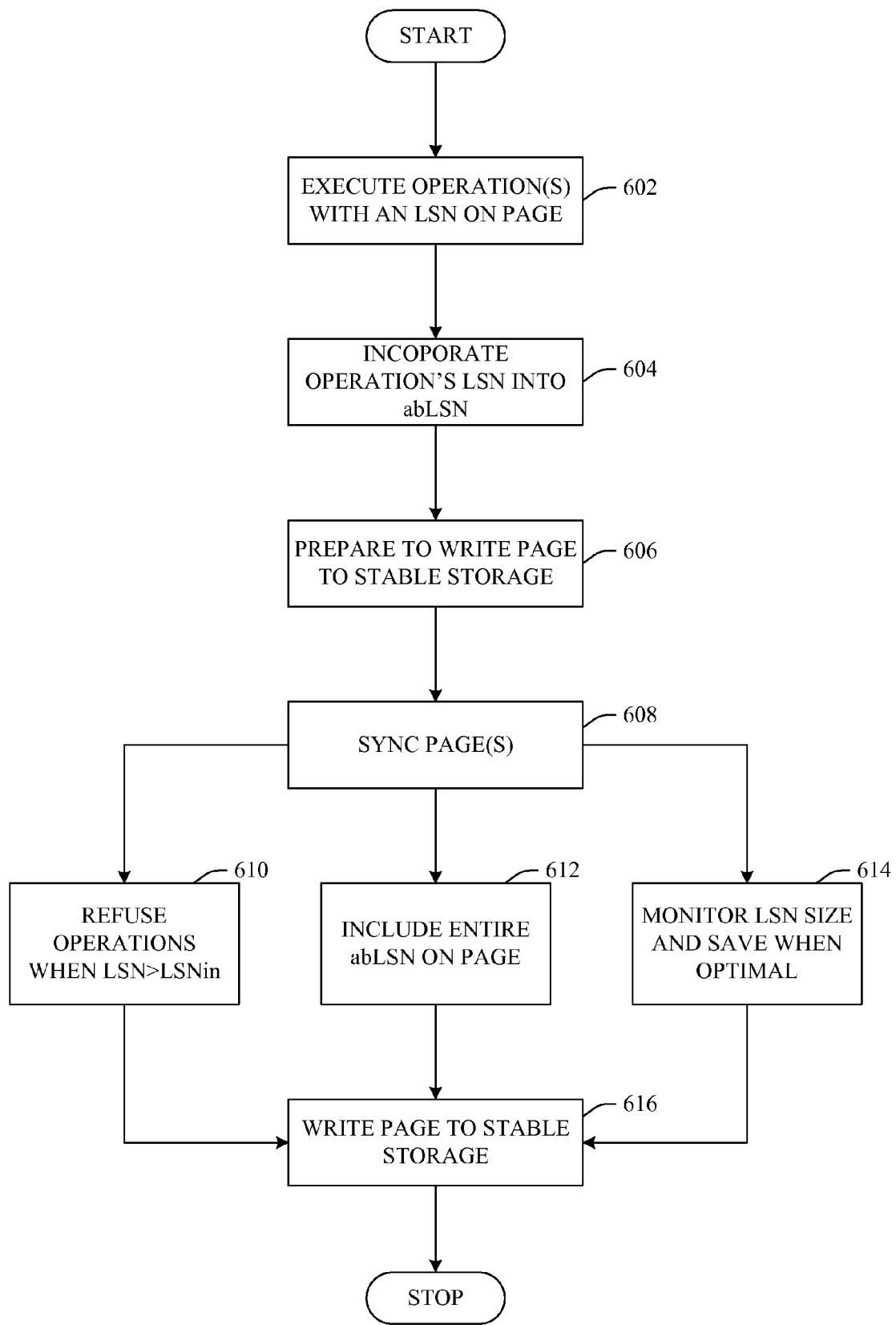
FIG. 6 illustrates an example flow chart of procedures that manage out-of-order operation execution in accordance with aspects of the innovation.

FIG. 6 illustrates a methodology of dealing with out-of-order execution in accordance with an aspect of the innovation. While, for purposes of simplicity of explanation, the one or more methodologies shown herein, e.g., in the form of a flow chart, are shown and described as a series of acts, it is to be understood and appreciated that the subject innovation is not limited by the order of acts, as some acts may, in accordance with the innovation, occur in a different order and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the innovation.

To deal with out-of-order execution, the innovation introduces the notion of an abstract page LSN denoted as abLSN. The meaning of <= is generalized so that the test, showing when redo is not required, becomes Operation LSN<=Page abLSN. Below is a description of how this can be accomplished. An Operation LSN is unchanged from before. But an abLSN is more complicated, and hence the resulting <= test is more complicated as well.

Referring now to FIG. 6, at 602 operations are captured. Here, it is important to capture precisely which operations have results captured in the state of a page. The abLSN is defined at 604 as accurately capturing every operation that has been executed and included in the state of the page. More precisely, it needs to indicate which operations' results are not included on the page. The abLSN consists of a low water LSNlw, whose value is such that no operation with an LSN<=LSNlw needs to be re-executed. The innovation augments LSNlw with the set {LSNin} of LSNs of operations greater than LSNlw whose effects are also included on the page. Thus, abLSN=<LSNlw, {LSNin}>. An operation with LSNi has results captured in the page with abLSN when LSNi<=abLSN where <= is defined as:

$$LSNi<=abLSN \text{ iff } LSNi<=LSNlw \text{ or } LSNi \text{ in } \{LSNin\}$$

With respect to establishing LSNlw, it can be helpful to address the question "how can the DC know that a particular value is suitable as LSNlw?" This means that the DC 106 would have already performed every operation with lower LSN which might be applicable on that page. If DC 106 has a pending unapplied operation with a lower LSN, it knows this, but because of multithreading, operations can come to the DC 106 out of LSN order. Thus, the DC 106 cannot determine by itself which operations are not yet applied. However, the TC 104 knows which LSNs were generated for operations, and which have definitely been performed, because it has replies to those operations. So, from time to time, the TC 104 can send the DC 106 LWM such that the TC 104 has received replies from the DC 106 for all operations with LSNs up to LWM.

The DC 106 can use the TC 104 supplied LWM in any of its cached pages as the LSNlw for the page. Simultaneously, the DC 106 can discard from the abLSN for the page any element of {LSNin} such that LSNin<=LSNlw.

At 606, preparation to write the page(s) to a stable storage is accomplished. Pages can be synced at 608. During normal execution, one need not keep abLSN in the page itself, as long as it is available in volatile memory outside the page, to be tested as required. However, when the page is flushed to disk, the abLSN can, and usually must, be made stable atomically with the page. This can be accomplished by including LSN information in the page itself. As shown in act 606, this is referred to as a page sync. In aspects, the innovation requires that all pages be synced before being written to stable storage.

As illustrated in FIG. 6, there are at least three distinct ways that pages can be synced. When a page is to be flushed, any of the methods or algorithms shown in 610-614 can be employed.

At 610, operations can be refused to execute on the page with LSN's greater than the highest valued LSNin. Eventually, the LSNlw sent by the TC will equal or exceed every LSNin, at which time the abLSN can be set for the page to LSNlw. It will be appreciated that this method can delay the page flush.

At 612, the entire existing abLSN can be included on the page. Unfortunately, this can take up more storage on the page than a single LSN. Finally, at 614, it is possible to wait until the number of LSNs in {LSNin} is reduced to a manageable size using a TC supplied LSNlw, and then include the abLSN on the page which is then flushed. At 616, the page(s) is written to stable storage. It is to be understood that the acts at 610-614 are but examples and are not intended to limit the innovation in any manner.

Figure 7:
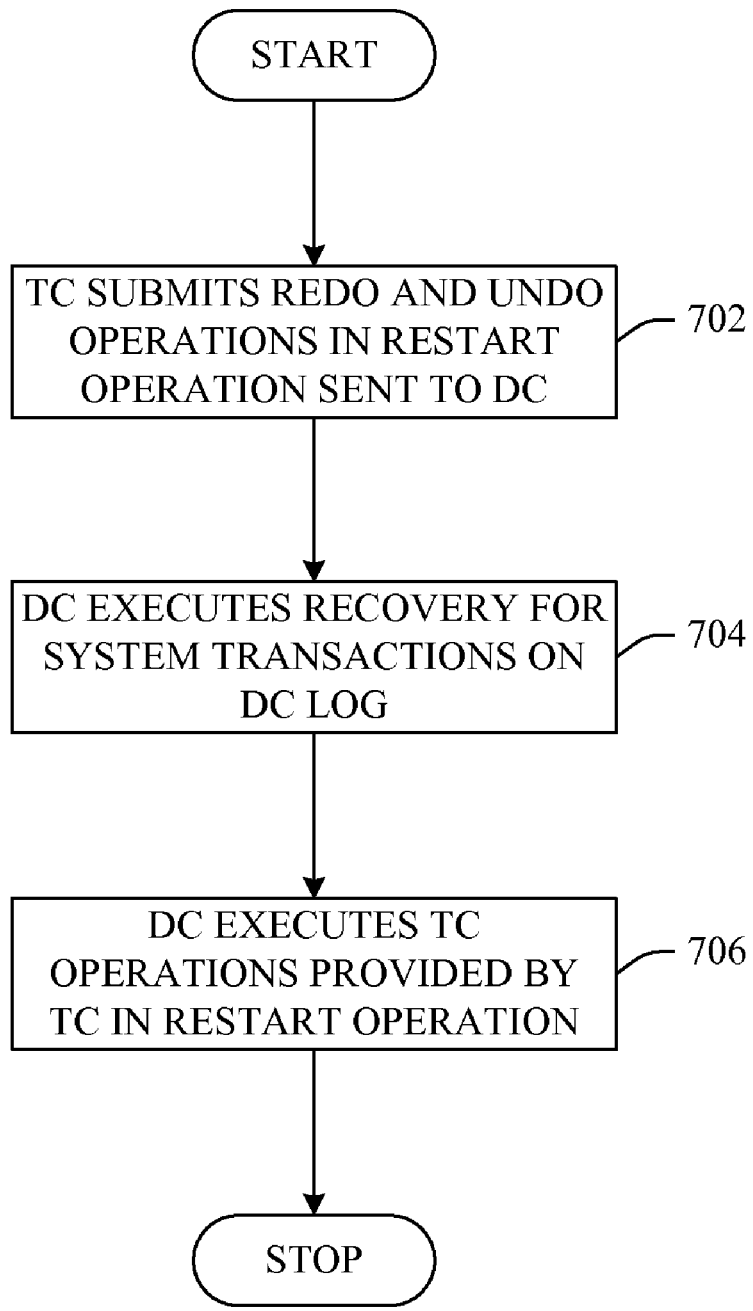
FIG. 7 illustrates an example flow chart of procedures that manage system transaction execution order in accordance with aspects of the innovation.

Referring now to FIG. 7, there is illustrated a methodology that describes system transaction execution order in accordance with the innovation. It is to be understood that most modern database systems exploit some form of atomic action to provide recovery for access method structure modifications. For instance, Microsoft-brand SQL Server uses a variant of multi-level recovery in which system transactions encapsulate structure modifications. The characteristic of existing system transactions is that like open nested transactions, system transactions are redone in precisely their original execution order. Undo recovery is done in two steps. First, incomplete system transactions are undone, and then user level transactions are undone. This is the usual multi-step undo accomplished for multi-level transactions and it ensures that logical user transaction undo operations find a search structure that is well formed when they are executed.

FIG. 7 illustrates operations in accordance with an unbundled kernel of the innovation. When the kernel is split or unbundled, it is the DC 106 that handles all page related operations, including all structure modifications to an index structure. These structure modification operations need to be atomic and recoverable. Continuing with the aforementioned example, Microsoft-brand SQL Server uses latching and system transactions for this. Because this is now done by the DC 106, both latching and the logging needed for system transactions must be done by the DC 106. Further, the DC 106 will use its own LSNs (dLSNs) to make structure modification recovery idempotent. That is, each page should contain both dLSN indicating which structure modifications are reflected in this page as well as an abLSN as described supra. It is to be understood that the Microsoft-brand SQL Server aspect is merely described to convey perspective to the innovation and is not intended to limit the scope of this disclosure or claims appended hereto in any manner.

As illustrated in box 702, splitting the kernel requires that the TC 104 submit logical redo as well as logical undo operations to the DC 106. Hence, indexes maintained by the DC 106 need to be well-formed before considering any logical redo sent by TC 104. That is, the DC 106 needs to make its search structures well-formed by completing any redo and undo of system transactions from the DC-log, prior to the DC executing TC's redo recovery operations as provided with TC's restart call, as shown in 704.

It is to be understood and appreciated that this order of activity during recovery moves system transaction recovery ahead of all TC level recovery. This change in the order of recovery means we need to manage LSN information correctly in order to indicate what operations, both from the DC-log and from the TC-log, are reflected in the page. As shown, thereafter, TC operation recovery can be executed at 706. In order to provide perspective to this concept, a discussion of system transactions involved in page splits and page deletions in a B-tree is provided.

Page splits make additional storage available to a B-tree. The DC-log has, among other log records, an entry that records the creation of the new page, and an entry that records the removal of keys from the pre-split page. When these DC-log events are moved forward during recovery, the page split is executed earlier in the update sequence relative to the TC operations that triggered the split. Repeat-history recovery can be made to work for this case.

First, the DC-log record for the new page needs to capture the page's abLSN at the time of the split since the log record for the new page contains the actual contents of the page. Second, the DC-log record for the pre-split page need only capture the split key value. Whatever version of that page exists on stable storage, its abLSN captures the state of this page. The innovation can use that abLSN validly for this page, whether it is found in a state prior to or later than the split.

When a page of an index structure is deleted, the search range for the page is logically consolidated with an adjacent page of the index structure. Such page deletes are moved forward in their execution during recovery as the DC-log is recovered before TC recovery. It will be appreciated that this complicates recovery. Page deletes reduce the amount of space available to the index structure. A consolidation that happens early may find that the contents of versions of the pages involved during recovery do not fit into a single page.

When the DC executes internal system transactions that do not commute with previously executed TC-generated logical operations, the DC 106 must provide a recoverable state that includes these prior operations, e.g., by generating a physical log record that encompasses the non-commutative prior operations. Thus, it is possible to make an entry in DC-log for the deletion of the page whose space is to be returned to free space; this log record can be logical, indicating that the page is no longer needed.

However, when a DC-log entry is produced for the consolidated page which inherits the deleted page's key range and perhaps the remaining records in that range, a physical DC-log record can be employed that captures the entire page including using an abLSN for the consolidated page that is the maximum of abLSNs of the two pages; redoing the consolidation amounts to giving the consolidated page the contents and key-range that it had immediately after the consolidation originally happened. That is, this logging/recovery technique forces the delete to keep its position in the execution order with respect to TC-submitted operations which are on the key range of the consolidated page. Such physical logging of a consolidated page is most often more costly in log space than the traditional logical system transaction for page deletes. Since page deletes are rare, the extra cost should not be significant.

There are no current database techniques for partial failure in a conventional bundled or monolithic DBMS kernel. In other words, failures in a monolithic database kernel are never partial—log and cache manager fail together. In accordance with the innovation, by splitting a database kernel, it is important to address the possibility that TC 104 and DC 106 can fail independently. The complete failure of both TC 104 and DC 106 returns one to the conventional fail-together situation and requires no new techniques. The innovation now considers separate, and hence partial, failures.

Turning first to the possible failure of DC 106, when the DC 106 fails, it loses its volatile (in-cache) state. The database state in the DC 106 reverts to the state captured on stable storage. Once the TC 104 has been notified, it resends operations forward from the redo scan start point, as indicated in the checkpoint). The DC 106 re-applies any of these operations which are missing from the stable state. It will be understood that this is similar to conventional recovery.

An important point in an unbundled design is that the TC 104 chooses the redo scan start point based on which operations have their idempotence guarantee terminated, because the DC 106 has checkpointed all these operations' effects; communicating from the DC 106 to the TC 104 that this has happened requires an extension to the interface between the components—the innovation describes this extension to the interface.

When the TC 104 fails and loses its log buffers while the DC 106 continues to run normally, the TC 104 needs a way of resetting the state of the DC 106 to an appropriate earlier state. One problem is that the TC 104 loses the tail of its log that had not been forced to stable storage, and some of these operations may have been already performed in a DC 106. Note that such pages can only be in a DC's cache; the causality principle enforces that no such pages are stable in a DC 106. That is, the DC cache may contain pages which reflect the effects of TC operations that have been lost. This must be reversed before the TC 104 resends operations from its stable log to be re-applied in a DC 106.

There are a number of ways to reset the DC 106 state to an earlier appropriate state. One way is to turn a partial failure into a complete failure. This drops all pages from the DC cache and permits conventional recovery to work. However, there is no need to be this draconian. A more efficient method is to drop from the cache only those pages that contain the results of operations that have been lost. Once this is accomplished, the TC 104 can begin resending operations; the DC 106 re-applies each, perhaps fetching the relevant page(s) from disk if they are no longer in the DC's cache. The pages that the DC 106 must drop from its cache to reset state correctly are exactly the pages whose abLSNs include operations that are later than LSNst, the largest LSN on the TC stable log.

It is possible to permit more than one TC 104 to update data at a given DC106. So long as the records of each application are disjoint, i.e., data is logically partitioned, having multiple TCs 104 accessing data at a given DC 106 can be supported, as the invariant that no conflicting operations are active simultaneously can be enforced separately by each TC 104. This does impose additional requirements on such a DC 106, however. An example of this scenario is described with reference to FIG. 8 below.

A DC 106 supporting multiple TCs 104 must be prepared to provide idempotence for each of the TCs 104. Since TCs 104 do not coordinate how they organize and manage their logs, the LSNs from each TC 104 need to be tracked separately by the DC 106. Thus, each page would need to include an abLSN for each TC 104 that has data on the page. However, pages with data from only a single TC 104 continue to need only one abLSN. So, only on pages containing data from multiple TCs 104 would extra abLSN's be needed.

When a TC 104 crashes, it may lose the log records for requests that it sent to a DC 106. The DC 106 must be able to reset the pages that it has in its volatile cache (the changes cannot have propagated to the disk). This scenario is described above for a single TC 104 sending requests to a DC 106. It is desirable that a DC 106 be able to reset pages that are affected by a TC crash so that only the failing TC 104 need resend requests and participate in recovery.

The DC 106 needs to reset pages where the abLSN of the failed TC 104 has captured operations that were not on the stable log when the failed TC 104 crashed. Identifying these pages is easy since the pages all have abLSN s for every TC 104 with data on the page. However, unlike before, it is not possible simply to replace such a page with the disk version of the page and then ask the failed TC 104 to resend the appropriate requests. The disk version of the page may also not contain changes produced by non-failing TCs 104. Such a replacement from disk would require that the other TCs 104 with updates that are removed replay their logs to restore these pages. It will be understood that it is this scenario that is desirable to avoid.

In accordance with the innovation, it is important to identify the data on each page that is associated with the failed TC 104. It is not desired to associate a LSN with each record, though that is a bit less of a hardship with multiple TCs 104. However, most pages are expected to have updates from a single TC 104, therefore, it is desirable to optimize for this case. To reset the pages containing lost updates of a failed TC 104, one needs to associate the failed TC's abLSN on the page with the data to which it applies. One way to accomplish this is to link the records related to a TC 104 to the single occurrence of the TC's abLSN on the page. For example, such links could be two byte offsets that chain the records together. A page reset would then consist of replacing the records on the page updated by a failed TC 104 with the records from the disk version of the page. Records updated by other (non-failing) TCs 104 would not be reset.

Turning now to a discussion of sharing data among multiple TCs 104, recall that operations executing concurrently at a DC 106 must not conflict. Hence, if one can limit the types of requests that multiple TCs 104 execute at a given DC 106 to ones that are non-conflicting, it is possible to permit shared access to the data managed by a DC 106. In this case, the assignments of logical portions of the data to different TCs 104 need not be disjoint. Arbitrary sharing is not permitted, but some types of sharing can be provided, so long as the reads are at low transaction isolation levels. The discussion that follows first describes types of TC 104 where shared access to data can be supported without any additional mechanism. The discussion then turns to show how sharing can be supported via versioned data.

Non-Versioned Data

Read-Only: All reads commute, regardless of their source. Therefore, it is possible for multiple TCs 104 to share read-only data with each other without difficulty. The data read will be transaction consistent because no TC 104 can change the data.

Dirty Reads: It is sometimes possible to share read and write access to mutable data. Dirty reads, where uncommitted data may be read, do not require any locking for reads. A writer may access and update data ("make it dirty") at any time without conflicting with a dirty read. Because a DC provides operation atomicity, a reader of dirty data will always see "well formed" data, though this data may be from uncommitted transactions. Dirty data can disappear should the updating transaction abort. Further, it can be modified subsequently, before its transaction commits. However, reading dirty data can sometimes be useful despite these caveats. Note that the above functionality requires no special DC knowledge or implementation.

Versioned Data

Read Committed Access: With versioned data, one can permit TCs 104 that update disjoint data partitions at a DC 106 to perform "read committed" reads of data updated by other TCs 104. With versioned data, an update produces a new uncommitted version of the record, while continuing to maintain an earlier before version. To provide an earlier version for inserts, one can insert two versions, a before "null" version followed by the intended insert.

When an updating TC 104 commits the transaction, it sends updates to the DC 106 to eliminate the before versions, making the later versions the committed versions. Should the transaction abort, the TC 104 sends operations to the DC 106 instructing it to remove the latest versions that were updated by the transaction.

A reader from another TC 104 that encounters a record with a before version reads the before version. If it encounters a record without a before version, it reads this single version. A TC 104 executing a transaction can be permitted to see its own updates on its own disjoint updatable partition while also reading committed data from other TCs 104. To do this requires that it issue a different flavor of read for its own partition of data.

An important characteristic of this approach is that there is no classic (e.g., blocking) two phase commit protocol in this picture. Once the TC 104 decides to commit, the transaction is committed everywhere and it is guaranteed that the earlier before versions of its updates will eventually be removed. An updating TC 104 is only blocked when it is actually down, in which case, none of its data is updatable in any event. The situation is similar when an updating TC 104 decides to abort. Readers are never blocked. Interestingly, this is non-blocking exactly because "read committed" access is being used with versioning.

Figure 8:
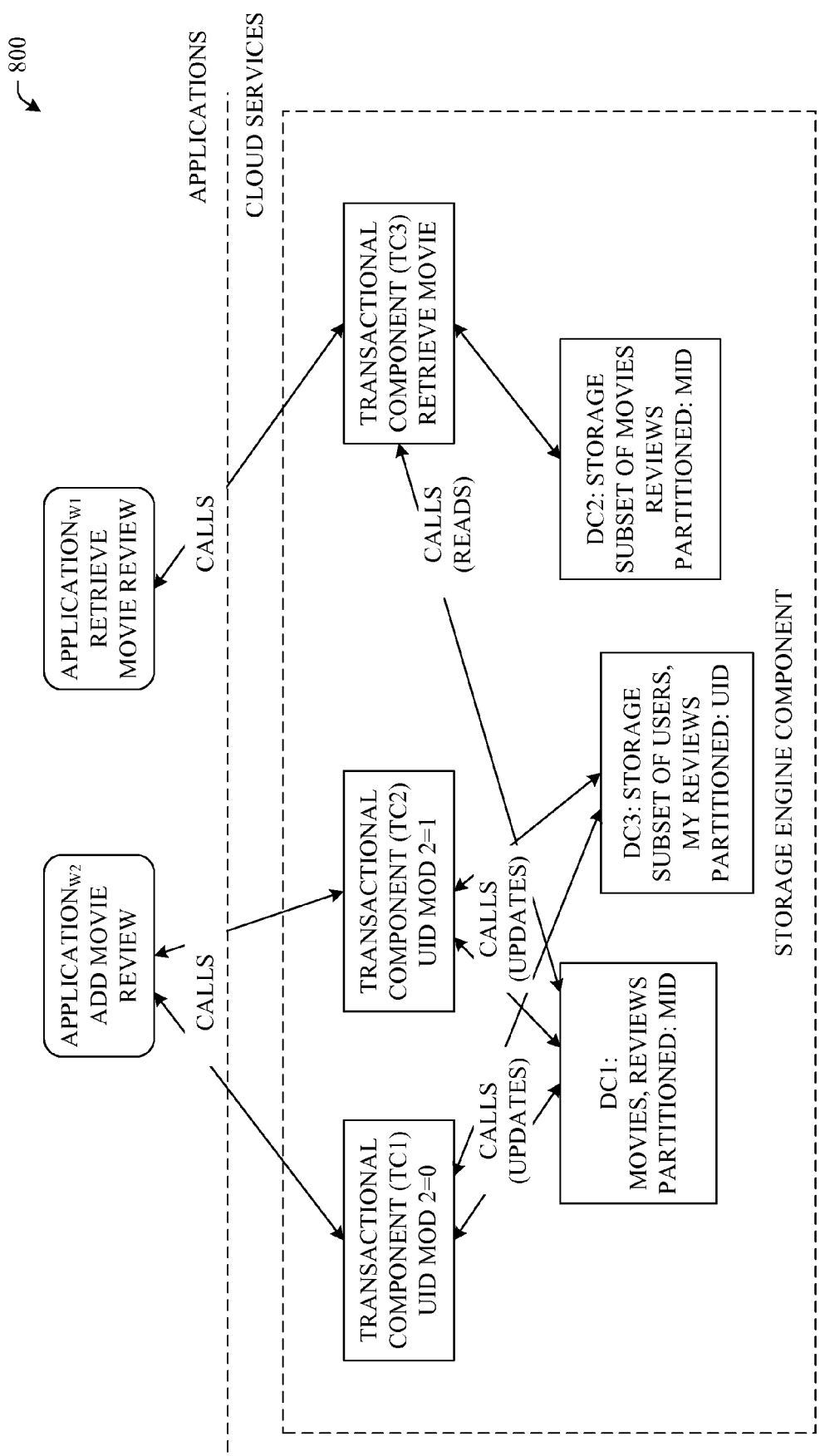
FIG. 8 illustrates an example cloud-based deployment that exploits versioning to permit multiple data clusterings to be supported by the cloud.

Referring now to FIG. 8, an example block diagram of a system 800 that illustrates a cloud-based sharing scenario in accordance with the unbundled DBMS kernel aspects of the innovation is shown. The example system 800 captures some of the kinds of sharing of data across TCs 104 that is desired in a cloud setting. In particular, system 800 is representative of an online movie site that tracks information about movies and allows users to write reviews. One fundamental problem here is that we want to cluster every review with both its reviewer and with the movie it discusses.

This permits high-performance clustered access for reading the reviews of a given movie (the most common operation in the system 800), as well as high-performance clustered access to a user and all her reviews. Unclustered access in the cloud is enormously more expensive, requiring access to a potentially very large collection of computers. However, at such a site, the most common update transactions involve a single user's data (e.g., reviews, profile, favorites, etc). As such it is desirable to avoid distributed transactions when users update their data and add reviews while still providing full transaction semantics across updates that span machines in the cloud.

There are at least four common transaction workloads to consider:
1. W1: obtain all reviews for a particular movie
2. W2: add a movie review written by a user
3. W3: update profile information for a user
4. W4: obtain all reviews written by a particular user Accordingly, there are four tables to support these workloads:
1. Movies (primary key MId): contains general information about each movie. Supports W1.
2. Reviews (primary key MId, UId) contains movie reviews written by users. Updated by W2 to support W1.
3. Users (primary key UId): contains profile information about users. Updated by W3.
4. MyReviews (primary key UId, MId): contains a copy of reviews written by a particular user. Updated by W2 to support W4. Effectively this table is an index in the physical schema since it contains redundant data from the Reviews tables.

FIG. 8 illustrates how data and transactions can be partitioned across TCs 104 and DCs 106 to achieve the goals of running the above workload without distributed transactions and without a query needing to access more than two machines to retrieve the desired data. Users and their workload (W2-W4) are partitioned among TCs 104, in this case TC1 and TC2. These TCs 104 have full access rights to all information about a user in the Users table and also have access rights to insert ("post") reviews by that user in the Reviews table. No one else has the right to post movie reviews by a particular user at any movie, so this is also a disjoint partitioning. Clearly, the updating TC 104 can also read the user information as it has full access rights to it. The Users table and MyReviews table may also be partitioned by user across DCs 106. This illustration shows DC3 containing such a partition.

With this partitioning, TC1 can add a movie review for a user by updating DC1 to insert the review in the Reviews table and DC3 to insert it in the MyReviews table. In this example, the transaction is completely local to TC1. Users can also obtain all of their reviews (W4) by simply querying a single partition of the MyReviews table.

One might also wish to enable TC3 to read all of the reviews for a movie in a single query (W1). Given that a movie may have a large number of reviews and that requests to read the reviews will be much more common than adding reviews, it is critical to cluster reviews with their corresponding movies at a single DC. To achieve this clustering the Movies and Reviews tables are partitioned by movie onto DC1 and DC2.

In this example, TC3 requires shared access. One cannot use "read only" access since the system 800 permits the data involved to be updated. This can be addressed without versioning if dirty reads are acceptable, as they do not conflict with access by updaters. With versioning, the innovation can provide read committed access as well, since such versioned reads do not conflict with updates. There is also potential for providing snapshot isolation and perhaps selectively strengthening it into serializability as needed by the applications. Thus, with shared (non-conflicting) access, the innovation can support some important scenarios that, on the surface may appear impossible to provide.

This specification discloses a paradigm shift in the way transactional recovery and concurrency control are provided in data management platforms. Compared to a traditional monolithic storage kernel with integrated transaction management, the innovation's unbundling approach can inevitably have longer code paths. This is justified by the flexibility of deploying adequately-grained cloud services. In addition, one can speculate about possible throughput gains on multi-core processors: with more compact code for separate TC 104 and DC 106, and the ability to instantiate each multiple times with configurable numbers of threads. In accordance with the innovation, more effective use of cores and better cache hit rates are contemplated.

Figure 9:
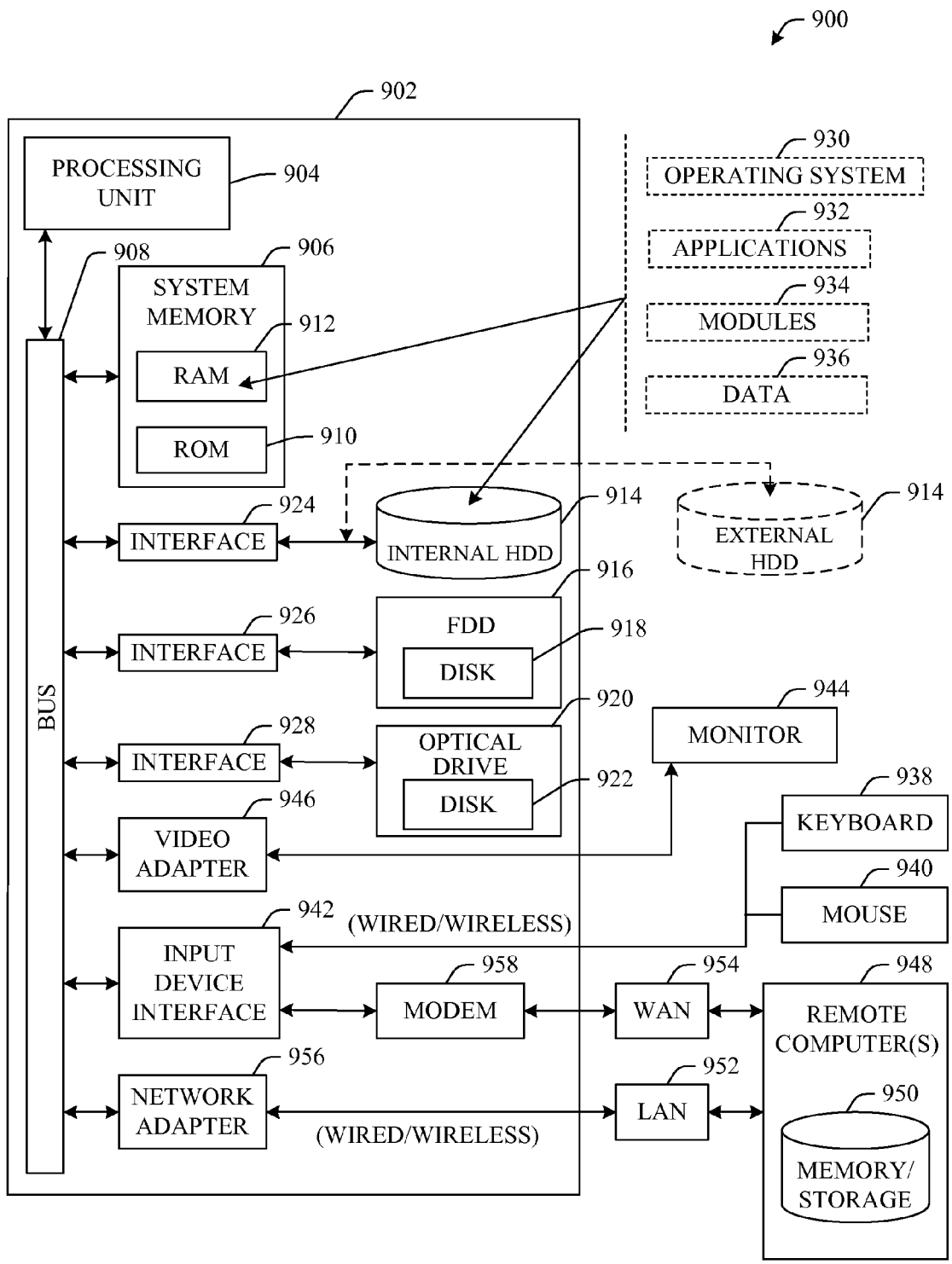
FIG. 9 illustrates a block diagram of a computer operable to execute the disclosed architecture.

Referring now to FIG. 9, there is illustrated a block diagram of a computer operable to execute the disclosed architecture. In order to provide additional context for various aspects of the subject innovation, FIG. 9 and the following discussion are intended to provide a brief, general description of a suitable computing environment 900 in which the various aspects of the innovation can be implemented. While the innovation has been described above in the general context of computer-executable instructions that may run on one or more computers, those skilled in the art will recognize that the innovation also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the innovation may also be practiced in distributed computing environments where certain tasks are performed by remote processing devices that are linked through a communications network. In a distributed computing environment, program modules can be located in both local and remote memory storage devices.

A computer typically includes a variety of computer-readable media. Computer-readable media can be any available media that can be accessed by the computer and includes both volatile and nonvolatile media, removable and non-removable media. By way of example, and not limitation, computer-readable media can comprise computer storage media and communication media. Computer storage media includes both volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

With reference again to FIG. 9, the exemplary environment 900 for implementing various aspects of the innovation includes a computer 902, the computer 902 including a processing unit 904, a system memory 906 and a system bus 908. The system bus 908 couples system components including, but not limited to, the system memory 906 to the processing unit 904. The processing unit 904 can be any of various commercially available processors. Dual microprocessors and other multi-processor architectures may also be employed as the processing unit 904.

The system bus 908 can be any of several types of bus structure that may further interconnect to a memory bus (with or without a memory controller), a peripheral bus, and a local bus using any of a variety of commercially available bus architectures. The system memory 906 includes read-only memory (ROM) 910 and random access memory (RAM) 912. A basic input/output system (BIOS) is stored in a non-volatile memory 910 such as ROM, EPROM, EEPROM, which BIOS contains the basic routines that help to transfer information between elements within the computer 902, such as during start-up. The RAM 912 can also include a high-speed RAM such as static RAM for caching data.

The computer 902 further includes an internal hard disk drive (HDD) 914 (e.g., EIDE, SATA), which internal hard disk drive 914 may also be configured for external use in a suitable chassis (not shown), a magnetic floppy disk drive (FDD) 916, (e.g., to read from or write to a removable diskette 918) and an optical disk drive 920, (e.g., reading a CD-ROM disk 922 or, to read from or write to other high capacity optical media such as the DVD). The hard disk drive 914, magnetic disk drive 916 and optical disk drive 920 can be connected to the system bus 908 by a hard disk drive interface 924, a magnetic disk drive interface 926 and an optical drive interface 928, respectively. The interface 924 for external drive implementations includes at least one or both of Universal Serial Bus (USB) and IEEE 1394 interface technologies. Other external drive connection technologies are within contemplation of the subject innovation.

The drives and their associated computer-readable media provide nonvolatile storage of data, data structures, computer-executable instructions, and so forth. For the computer 902, the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer, such as zip drives, magnetic cassettes, flash memory cards, cartridges, and the like, may also be used in the exemplary operating environment, and further, that any such media may contain computer-executable instructions for performing the methods of the innovation.

A number of program modules can be stored in the drives and RAM 912, including an operating system 930, one or more application programs 932, other program modules 934 and program data 936. All or portions of the operating system, applications, modules, and/or data can also be cached in the RAM 912. It is appreciated that the innovation can be implemented with various commercially available operating systems or combinations of operating systems.

A user can enter commands and information into the computer 902 through one or more wired/wireless input devices, e.g., a keyboard 938 and a pointing device, such as a mouse 940. Other input devices (not shown) may include a microphone, an IR remote control, a joystick, a game pad, a stylus pen, touch screen, or the like. These and other input devices are often connected to the processing unit 904 through an input device interface 942 that is coupled to the system bus 908, but can be connected by other interfaces, such as a parallel port, an IEEE 1394 serial port, a game port, a USB port, an IR interface, etc.

A monitor 944 or other type of display device is also connected to the system bus 908 via an interface, such as a video adapter 946. In addition to the monitor 944, a computer typically includes other peripheral output devices (not shown), such as speakers, printers, etc.

The computer 902 may operate in a networked environment using logical connections via wired and/or wireless communications to one or more remote computers, such as a remote computer(s) 948. The remote computer(s) 948 can be a workstation, a server computer, a router, a personal computer, portable computer, microprocessor-based entertainment appliance, a peer device or other common network node, and typically includes many or all of the elements described relative to the computer 902, although, for purposes of brevity, only a memory/storage device 950 is illustrated. The logical connections depicted include wired/wireless connectivity to a local area network (LAN) 952 and/or larger networks, e.g., a wide area network (WAN) 954. Such LAN and WAN networking environments are commonplace in offices and companies, and facilitate enterprise-wide computer networks, such as intranets, all of which may connect to a global communications network, e.g., the Internet.

When used in a LAN networking environment, the computer 902 is connected to the local network 952 through a wired and/or wireless communication network interface or adapter 956. The adapter 956 may facilitate wired or wireless communication to the LAN 952, which may also include a wireless access point disposed thereon for communicating with the wireless adapter 956.

When used in a WAN networking environment, the computer 902 can include a modem 958, or is connected to a communications server on the WAN 954, or has other means for establishing communications over the WAN 954, such as by way of the Internet. The modem 958, which can be internal or external and a wired or wireless device, is connected to the system bus 908 via the serial port interface 942. In a networked environment, program modules depicted relative to the computer 902, or portions thereof, can be stored in the remote memory/storage device 950. It will be appreciated that the network connections shown are exemplary and other means of establishing a communications link between the computers can be used.

The computer 902 is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11(a, b, g, etc.) to provide secure, reliable, fast wireless connectivity. A Wi-Fi network can be used to connect computers to each other, to the Internet, and to wired networks (which use IEEE 802.3 or Ethernet). Wi-Fi networks operate in the unlicensed 2.4 and 5 GHz radio bands, at an 11 Mbps (802.11a) or 54 Mbps (802.11b) data rate, for example, or with products that contain both bands (dual band), so the networks can provide real-world performance similar to the basic 10BaseT wired Ethernet networks used in many offices.

Figure 10:
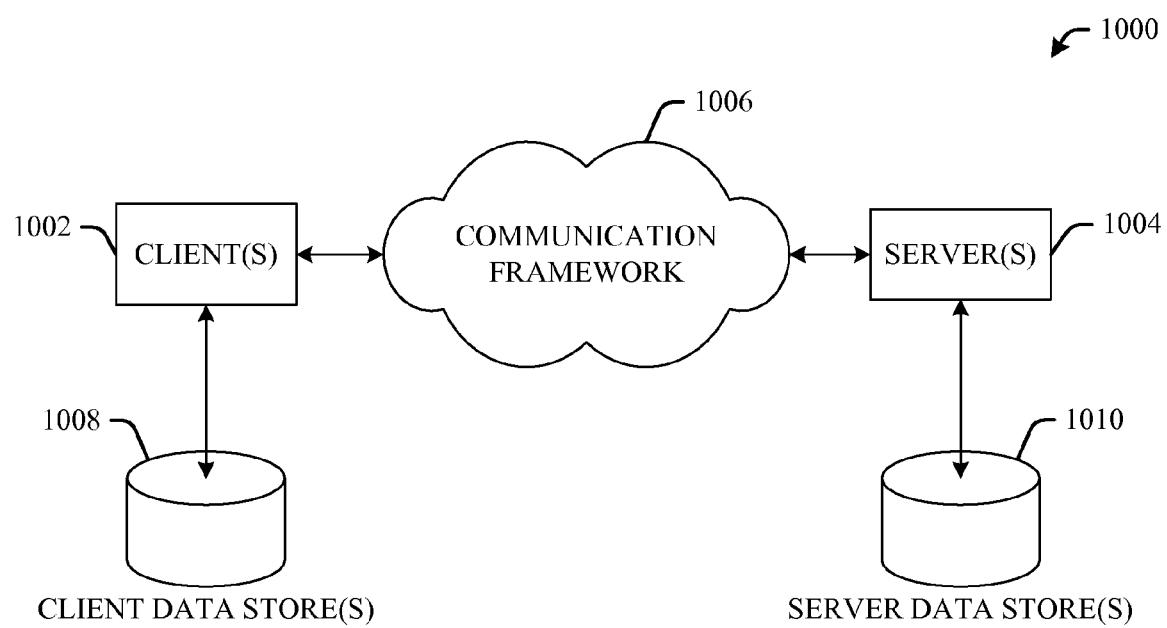
FIG. 10 illustrates a schematic block diagram of an exemplary computing environment in accordance with the subject innovation.

Referring now to FIG. 10, there is illustrated a schematic block diagram of an exemplary computing environment 1000 in accordance with the subject innovation. The system 1000 includes one or more client(s) 1002. The client(s) 1002 can be hardware and/or software (e.g., threads, processes, computing devices). The client(s) 1002 can house cookie(s) and/or associated contextual information by employing the innovation, for example.

The system 1000 also includes one or more server(s) 1004. The server(s) 1004 can also be hardware and/or software (e.g., threads, processes, computing devices). The servers 1004 can house threads to perform transformations by employing the innovation, for example. One possible communication between a client 1002 and a server 1004 can be in the form of a data packet adapted to be transmitted between two or more computer processes. The data packet may include a cookie and/or associated contextual information, for example. The system 1000 includes a communication framework 1006 (e.g., a global communication network such as the Internet) that can be employed to facilitate communications between the client(s) 1002 and the server(s) 1004.

Communications can be facilitated via a wired (including optical fiber) and/or wireless technology. The client(s) 1002 are operatively connected to one or more client data store(s) 1008 that can be employed to store information local to the client(s) 1002 (e.g., cookie(s) and/or associated contextual information). Similarly, the server(s) 1004 are operatively connected to one or more server data store(s) 1010 that can be employed to store information local to the servers 1004.

What has been described above includes examples of the innovation. It is, of course, not possible to describe every conceivable combination of components or methodologies for purposes of describing the subject innovation, but one of ordinary skill in the art may recognize that many further combinations and permutations of the innovation are possible. Accordingly, the innovation is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A transactional data storage system, comprising:
a transaction component (TC) to provide a logical interface to map records to a memory, the TC to:
receive multiple transactions from one or more applications;
lock a database prior to sending a request to initiate each of the multiple transactions, the lock to enable transactional concurrency control;
send a request to initiate a transaction of the multiple transactions; and
log the transaction to enable aborting the transaction; and
a data component (DC) that operates architecturally autonomous relative to the TC, the DC to provide logical locking and logging of operations performed to the database, the DC contracting with the TC to:
receive the request to initiate the transaction from the transaction component; and
perform an atomic operation to the database in response to receiving the request based on the transaction, the atomic operation performed in an order that is conflict consistent with when the transaction was received;
wherein the TC contracts with the DC to prevent concurrently sending additional transactions from the multiple transactions that conflict with the transaction.

2. The system of claim 1, wherein the DC verifies that performing the atomic operation is idempotent.

3. The system of claim 1, wherein the TC informs the DC of a most recent stable atomic operation via a TC log.

4. The system of claim 1, wherein:
the TC informs the DC of a most recent atomic operation for which earlier atomic operations have received replies;

the DC manages its cache correctly as a function of the most recent atomic operation to provide recovery; and the DC informs the TC of the most recent atomic operation for which all earlier atomic operations have had their results made stable by the DC.

5. The system of claim 1, wherein the DC provides a logical data interface that hides information as to where logical data is placed on storage devices.

6. The system of claim 5, wherein the logical data consists of records.

7. The system of claim 1, wherein the DC can be deployed on separate hardware elements, including separate cores or processors, disk controllers, or in distributed storage facilities, wherein the distributed storage facilities are at least one of network attached storage or cloud storage.

8. The system of claim 1, the TC comprising:

a locking component that facilitates transaction concurrency control among logical operations; and a logging component that retains a transaction log of logical operations sent to the DC, wherein the transaction log enables undo, redo or recovery.

9. The system of claim 8, further comprising a data management component that enables each of the logical operations to be atomic and idempotent.

10. The system of claim 9, further comprising an atomic operations component that linearizes concurrent operations, wherein linearization isolates each of the operations with regard to concurrent execution.

11. The system of claim 1, further comprising an index component that establishes or maintains indexes and storage structures and masks the indexes and storages structures from the TC.

12. The system of claim 1, further comprising a cache component that stages data pages to and from a storage device.

13. A computer-implemented method under control of one or more processors configured with executable instructions, the computer-implemented method comprising:

executing operations with a corresponding log sequence number (LSN) on a page of a memory;

establishing an abstract LSN (abLSN) based upon the LSN associated with the operations, wherein the abLSN represents the operations that correspond to results on a page;

maintaining the page and abLSN in the memory;

submitting redo or undo operations in restart operations;

providing multi-level redo of operations in which a data component (DC) recovers internal data access methods prior to permitting a transaction component (TC) to recover the logical operations that are on a TC log.

14. The computer-implemented method of claim 13, further comprising synchronizing abLSN to a page upon flushing to the memory.

15. The computer implemented method of claim 13, further comprising completing redo and undo operations from a data component (DC) log prior to executing redo recovery from the TC log.

* * * * *